United States Patent
Suciu et al.

(10) Patent No.: US 8,033,092 B2
(45) Date of Patent: Oct. 11, 2011

(54) TIP TURBINE ENGINE INTEGRAL FAN, COMBUSTOR, AND TURBINE CASE

(75) Inventors: Gabriel L. Suciu, Glastonbury, CT (US); James W. Norris, Lebanon, CT (US); Craig A. Nordeen, Manchester, CT (US); Brian Merry, Andover, CT (US)

(73) Assignee: United Technologies Corporation, Hartford, CT (US)

( * ) Notice: Subject to any disclaimer, the term of this patent is extended or adjusted under 35 U.S.C. 154(b) by 696 days.

(21) Appl. No.: 11/720,539

(22) PCT Filed: Dec. 1, 2004

(86) PCT No.: PCT/US2004/039973
§ 371 (c)(1),
(2), (4) Date: May 31, 2007

(87) PCT Pub. No.: WO2006/059971
PCT Pub. Date: Jun. 8, 2006

(65) Prior Publication Data
US 2009/0120058 A1    May 14, 2009

(51) Int. Cl.
*F02K 3/02*    (2006.01)
(52) U.S. Cl. .......................... 60/39.43; 60/262
(58) Field of Classification Search .............. 60/39.43, 60/224, 226.1, 229, 244, 262, 263
See application file for complete search history.

(56) References Cited

U.S. PATENT DOCUMENTS

| | | | |
|---|---|---|---|
| 1,544,318 A | 6/1925 | Hodgkinson | |
| 1,923,251 A * | 8/1933 | Bauer et al. | 415/145 |
| 2,221,685 A | 11/1940 | Smith | |
| 2,414,410 A | 1/1947 | Griffith | |
| 2,499,831 A | 3/1950 | Palmatier | |
| 2,548,975 A | 4/1951 | Hawthorne | |
| 2,611,241 A | 9/1952 | Schulz | |
| 2,620,554 A | 12/1952 | Mochel et al. | |
| 2,698,711 A | 1/1955 | Newcomb | |
| 2,801,789 A | 8/1957 | Moss | |
| 2,830,754 A | 4/1958 | Stalker | |
| 2,874,926 A | 2/1959 | Gaubatz | |
| 2,945,960 A * | 7/1960 | Obrist | 290/52 |
| 2,989,848 A | 6/1961 | Paiement | |
| 3,009,630 A | 11/1961 | Busquet | |
| 3,037,742 A | 6/1962 | Dent et al. | |
| 3,042,349 A | 7/1962 | Pirtle et al. | |
| 3,081,597 A | 3/1963 | Kosin et al. | |
| 3,132,842 A | 5/1964 | Tharp | |

(Continued)

FOREIGN PATENT DOCUMENTS
DE    1301364    8/1969
(Continued)

*Primary Examiner* — Ehud Gartenberg
*Assistant Examiner* — Vikansha Dwivedi
(74) *Attorney, Agent, or Firm* — Carlson, Gaskey & Olds, P.C.

(57) ABSTRACT

A tip turbine engine assembly includes an integral engine outer case located radially outward from a fan assembly. The integral outer case includes a rear portion and a forward portion with an arcuate portion that curves radially inwardly to form a compartment. An annular combustor is housed and mounted in the compartment. Fan inlet guide vanes are integrally formed with the arcuate portion to form the integral case portion. The rear portion, forward portion, and fan inlet guide vanes are integrally formed in a casting process.

17 Claims, 4 Drawing Sheets

U.S. PATENT DOCUMENTS

| | | |
|---|---|---|
| 3,204,401 A | 9/1965 | Serriades |
| 3,212,664 A * | 10/1965 | Wagle .......................... 220/591 |
| 3,216,455 A | 11/1965 | Cornell et al. |
| 3,267,667 A | 8/1966 | Erwin |
| 3,269,120 A | 8/1966 | Sabatiuk |
| 3,283,509 A | 11/1966 | Nitsch |
| 3,286,461 A | 11/1966 | Johnson |
| 3,302,397 A | 2/1967 | Davidovic |
| 3,363,419 A | 1/1968 | Wilde |
| 3,404,831 A | 10/1968 | Campbell |
| 3,465,526 A | 9/1969 | Emerick |
| 3,496,725 A | 2/1970 | Ferri et al. |
| 3,505,819 A | 4/1970 | Wilde |
| 3,616,616 A | 11/1971 | Flatt |
| 3,684,857 A | 8/1972 | Morley et al. |
| 3,703,081 A | 11/1972 | Krebs et al. |
| 3,705,775 A | 12/1972 | Rioux |
| 3,720,060 A | 3/1973 | Davies et al. |
| 3,729,957 A | 5/1973 | Petrie et al. |
| 3,735,593 A | 5/1973 | Howell |
| 3,811,273 A | 5/1974 | Martin |
| 3,818,695 A | 6/1974 | Rylewski |
| 3,836,279 A | 9/1974 | Lee |
| 3,861,822 A | 1/1975 | Wanger |
| 3,932,813 A | 1/1976 | Gallant |
| 3,979,087 A | 9/1976 | Boris et al. |
| 4,005,575 A | 2/1977 | Scott et al. |
| 4,130,379 A | 12/1978 | Partington |
| 4,147,035 A | 4/1979 | Moore et al. |
| 4,251,185 A | 2/1981 | Karstensen |
| 4,251,987 A | 2/1981 | Adamson |
| 4,265,646 A | 5/1981 | Weinstein et al. |
| 4,271,674 A | 6/1981 | Marshall et al. |
| 4,298,090 A | 11/1981 | Chapman |
| 4,326,682 A | 4/1982 | Nightingale |
| 4,452,038 A | 6/1984 | Soligny |
| 4,463,553 A | 8/1984 | Boudigues |
| 4,561,257 A | 12/1985 | Kwan et al. |
| 4,563,875 A | 1/1986 | Howald |
| 4,631,092 A | 12/1986 | Ruckle et al. |
| 4,751,816 A | 6/1988 | Perry |
| 4,785,625 A | 11/1988 | Stryker et al. |
| 4,817,382 A | 4/1989 | Rudolph et al. |
| 4,834,614 A | 5/1989 | Davids et al. |
| 4,883,404 A | 11/1989 | Sherman |
| 4,887,424 A | 12/1989 | Geidel et al. |
| 4,904,160 A | 2/1990 | Partington |
| 4,912,927 A | 4/1990 | Billington |
| 4,965,994 A | 10/1990 | Ciokajlo et al. |
| 4,999,994 A | 3/1991 | Rud et al. |
| 5,010,729 A | 4/1991 | Adamson et al. |
| 5,012,640 A | 5/1991 | Mirville |
| 5,014,508 A | 5/1991 | Lifka |
| 5,088,742 A | 2/1992 | Catlow |
| 5,107,676 A | 4/1992 | Hadaway et al. |
| 5,157,915 A | 10/1992 | Bart |
| 5,182,906 A | 2/1993 | Gilchrist et al. |
| 5,224,339 A | 7/1993 | Hayes |
| 5,232,333 A | 8/1993 | Girault |
| 5,267,397 A | 12/1993 | Wilcox |
| 5,269,139 A | 12/1993 | Klees |
| 5,275,536 A | 1/1994 | Stephens et al. |
| 5,315,821 A | 5/1994 | Dunbar et al. |
| 5,328,324 A | 7/1994 | Dodd |
| 5,443,590 A | 8/1995 | Ciokajlo et al. |
| 5,466,198 A | 11/1995 | McKibbin et al. |
| 5,497,961 A | 3/1996 | Newton |
| 5,501,575 A | 3/1996 | Eldredge et al. |
| 5,537,814 A | 7/1996 | Nastuk et al. |
| 5,584,660 A | 12/1996 | Carter et al. |
| 5,628,621 A | 5/1997 | Toborg |
| 5,746,391 A | 5/1998 | Rodgers et al. |
| 5,769,317 A | 6/1998 | Sokhey et al. |
| 6,004,095 A | 12/1999 | Waitz et al. |
| 6,095,750 A | 8/2000 | Ross et al. |
| 6,102,361 A | 8/2000 | Riikonen |
| 6,158,207 A | 12/2000 | Polenick et al. |
| 6,223,616 B1 | 5/2001 | Sheridan |
| 6,244,539 B1 | 6/2001 | Lifson et al. |
| 6,364,805 B1 | 4/2002 | Stegherr |
| 6,381,948 B1 | 5/2002 | Klingels |
| 6,382,915 B1 | 5/2002 | Aschermann et al. |
| 6,384,494 B1 | 5/2002 | Avidano et al. |
| 6,430,917 B1 | 8/2002 | Platts |
| 6,454,535 B1 | 9/2002 | Goshorn et al. |
| 6,471,474 B1 | 10/2002 | Mielke et al. |
| RE37,900 E | 11/2002 | Partington |
| 6,513,334 B2 | 2/2003 | Varney |
| 6,619,030 B1 | 9/2003 | Seda et al. |
| 6,764,276 B2 * | 7/2004 | Mulcaire et al. .............. 415/119 |
| 6,851,264 B2 | 2/2005 | Kirtley et al. |
| 6,883,303 B1 | 4/2005 | Seda |
| 6,910,854 B2 | 6/2005 | Joslin |
| 7,021,042 B2 | 4/2006 | Law |
| 7,214,157 B2 | 5/2007 | Flamang et al. |
| 2002/0190139 A1 | 12/2002 | Morrison |
| 2003/0031556 A1 * | 2/2003 | Mulcaire et al. .............. 415/119 |
| 2003/0131602 A1 | 7/2003 | Ingistov |
| 2003/0131607 A1 | 7/2003 | Daggett |
| 2003/0192304 A1 | 10/2003 | Paul |
| 2004/0025490 A1 | 2/2004 | Paul |
| 2004/0070211 A1 | 4/2004 | Franchet et al. |
| 2004/0189108 A1 | 9/2004 | Dooley |
| 2004/0219024 A1 | 11/2004 | Soupizon et al. |
| 2005/0008476 A1 | 1/2005 | Eleftheriou |
| 2005/0127905 A1 | 6/2005 | Proctor et al. |
| 2009/0252606 A1 * | 10/2009 | Jahnen ....................... 415/208.1 |

FOREIGN PATENT DOCUMENTS

| | | |
|---|---|---|
| FR | 2274788 | 1/1976 |
| GB | 905136 | 9/1962 |
| GB | 1287223 | 8/1972 |
| GB | 1503394 | 3/1978 |
| GB | 2026102 | 1/1980 |
| JP | 10184305 | 7/1998 |
| WO | 02081883 | 10/2002 |
| WO | 2004011788 | 2/2004 |
| WO | 2004092567 | 10/2004 |
| WO | 2006059978 | 6/2006 |
| WO | 2006059988 | 6/2006 |
| WO | 2006059989 | 6/2006 |
| WO | 2006060006 | 6/2006 |
| WO | 2006062497 | 6/2006 |
| WO | 2006059971 | 8/2006 |
| WO | 2006059979 | 6/2007 |

* cited by examiner

TIP TURBINE ENGINE INTEGRAL FAN, COMBUSTOR, AND TURBINE CASE

BACKGROUND OF THE INVENTION

The present invention relates to a tip turbine engine, and more particularly to an integral engine case surrounding the engine fan, combustor, and turbine.

An aircraft gas turbine engine of the conventional turbofan type generally includes a forward bypass fan and a low pressure compressor, a middle core engine including a combustor, and an aft low pressure turbine all located along a common longitudinal axis. Although highly efficient, conventional turbofan engines operate in a axial flow relationship. The axial flow relationship results in a relatively complicated elongated engine structure and therefore requires separate engine cases for the bypass fan, low pressure compressor, combustor, and low pressure turbine. Each engine case may further include several joints and structural attachments, often making assembly of the engine cases laborious and expensive.

A recent development in gas turbine engines is the more longitudinally compact tip turbine engine. Tip turbine engines locate an axial compressor forward of a bypass fan, which includes hollow fan blades that receive airflow from the axial compressor therethrough such that the hollow fan blades operate as a centrifugal compressor. Compressed core airflow from the hollow fan blades is mixed with fuel in an annular combustor located radially outward from the fan. The combustor ignites the fuel mixture to form a high energy gas stream which drives turbine blades that are integrated onto the tips of the hollow bypass fan blades for rotation therewith as disclosed in U.S. Patent Application Publication Nos.: 2003192303; 20030192304; and 20040025490. The tip turbine engine provides a thrust to weight ratio comparable to conventional turbofan engines of the same class within a package of significantly shorter longitudinal length.

Accordingly and because of the shorter longitudinal length of the tip turbine engine, it is desirable to eliminate the laborious and expensive assembly of several cases by providing an integrated one-piece engine case for the engine fan, combustor, and turbine.

SUMMARY OF THE INVENTION

The tip turbine engine assembly according to the present invention provides an engine outer case that includes an integral case portion that is radially outward from a fan and a combustor. The fan rotates in a fan plane and includes a core airflow passage therethrough. A diffuser section communicates core airflow from the core airflow passage to a combustor that is located axially forward of the fan and is not intersected by the fan plane. The integral case portion includes an inlet guide vane extending radially inwardly from the outer case. The inlet guide vane is integrally formed in a casting process with the integral case portion to form a unitary engine case.

The integral case portion may include a composite layer with woven Kevlar™ fiber reinforcement in a double wall construction with a metallic layer.

In another tip turbine engine assembly example, the integral case portion includes an integral fan case portion joined on a forward end with a fastener at a flange joint to an integral combustor case portion. The integral fan case portion is welded at a rear end portion to an exhaust case portion. The integral combustor case portion is welded to an integral inlet guide vane at a welded joint.

The present invention therefore eliminates assembly of several cases by providing an integrated engine case for the engine fan and combustor, and turbine.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
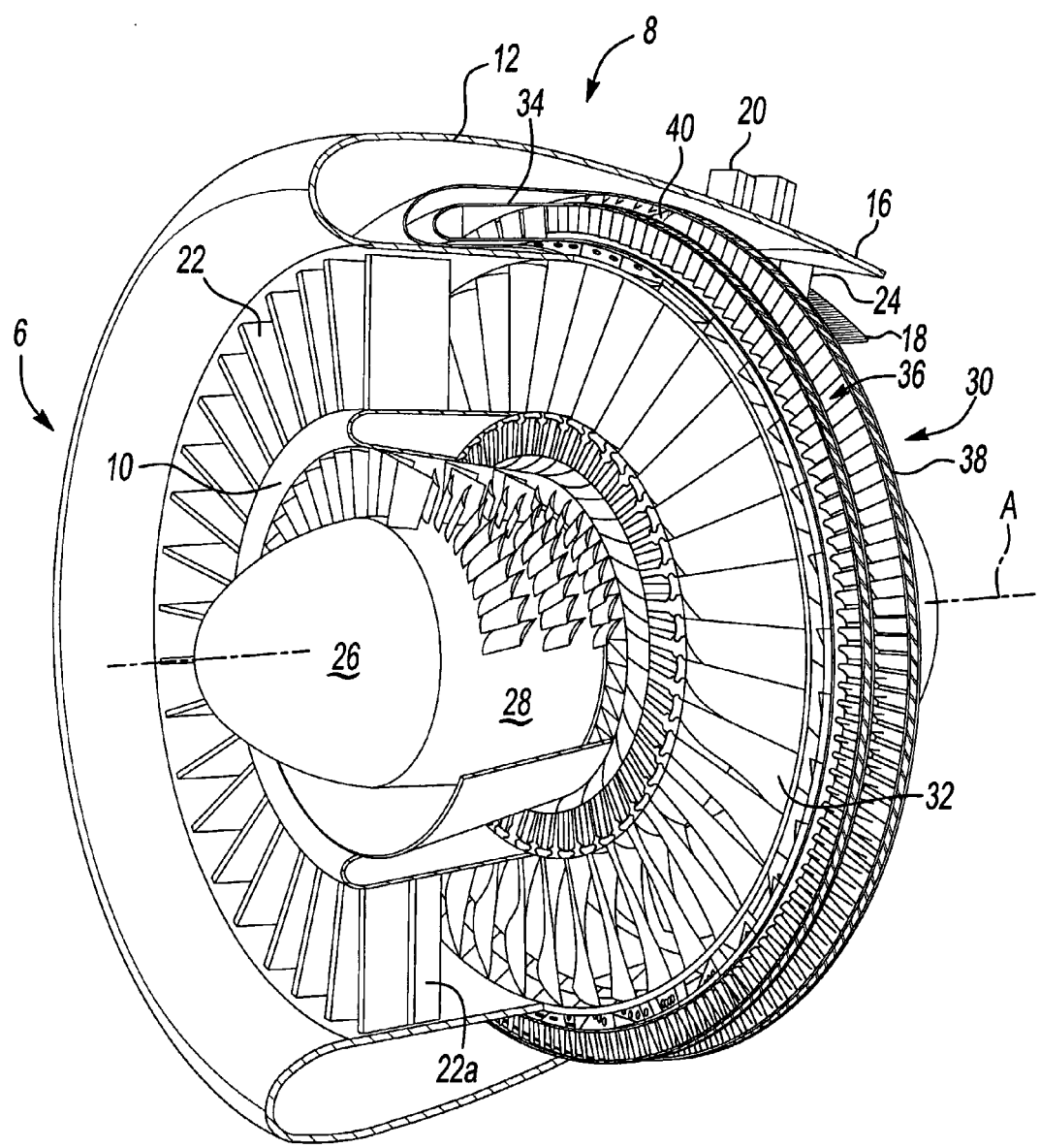
FIG. 1 is a partial sectional perspective view an exemplary tip turbine engine assembly of the present invention.

FIG. 1 illustrates a partial sectional perspective view of a tip turbine engine (TTE) type gas turbine engine 6. The engine 6 includes an outer case 8 and a rotationally fixed static inner support structure 10. The outer case 8 includes an integral case portion 12 welded to an exhaust case portion 16 which includes an exhaust mixer 18 and a plurality of engine mounts 20. A plurality of fan inlet guide vanes 22 are integrally formed with the integral case portion 12 to form a unitary engine case. The integral case portion 12 and inlet guide vanes 22 are formed by casting, although other forming processes may be utilized. The inlet guide vanes 22 extend to the static inner support structure 10 and each inlet guide vane 22 preferably includes a variable trailing edge 22A. A plurality of exit guide vanes 24 extend radially inward from the exhaust case portion 16.

A nosecone 26 is preferably located along the engine centerline A to improve airflow into an axial compressor 28. The axial compressor 28 is mounted about the engine centerline A behind the nosecone 26.

A fan-turbine rotor assembly 30 is mounted for rotation in fan plane P (FIG. 2) about the engine centerline A aft of the axial compressor 28. The fan-turbine rotor assembly 30 includes a plurality of hollow fan blades 32 to provide internal, centrifugal compression of the compressed airflow from the axial compressor 28 for distribution to an annular combustor 34 located within the outer case 8.

A turbine 36 includes a plurality of tip turbine blades 38 (two stages shown) which rotatably drive the hollow fan blades 32 relative a plurality of tip turbine stators 40 which extend radially inward from the outer case 8. The annular combustor 34, which is in fluid communication with the turbine 36, is axially forward of the turbine 36 and is not intersected by the fan plane P. A barrier 39 separates the turbine 36 and tip turbine blades 38 from the hollow fan blades 32 such that compressed air passing through the hollow fan blades 32 does not impinge upon the tip turbine blades 38.

Figure 2:
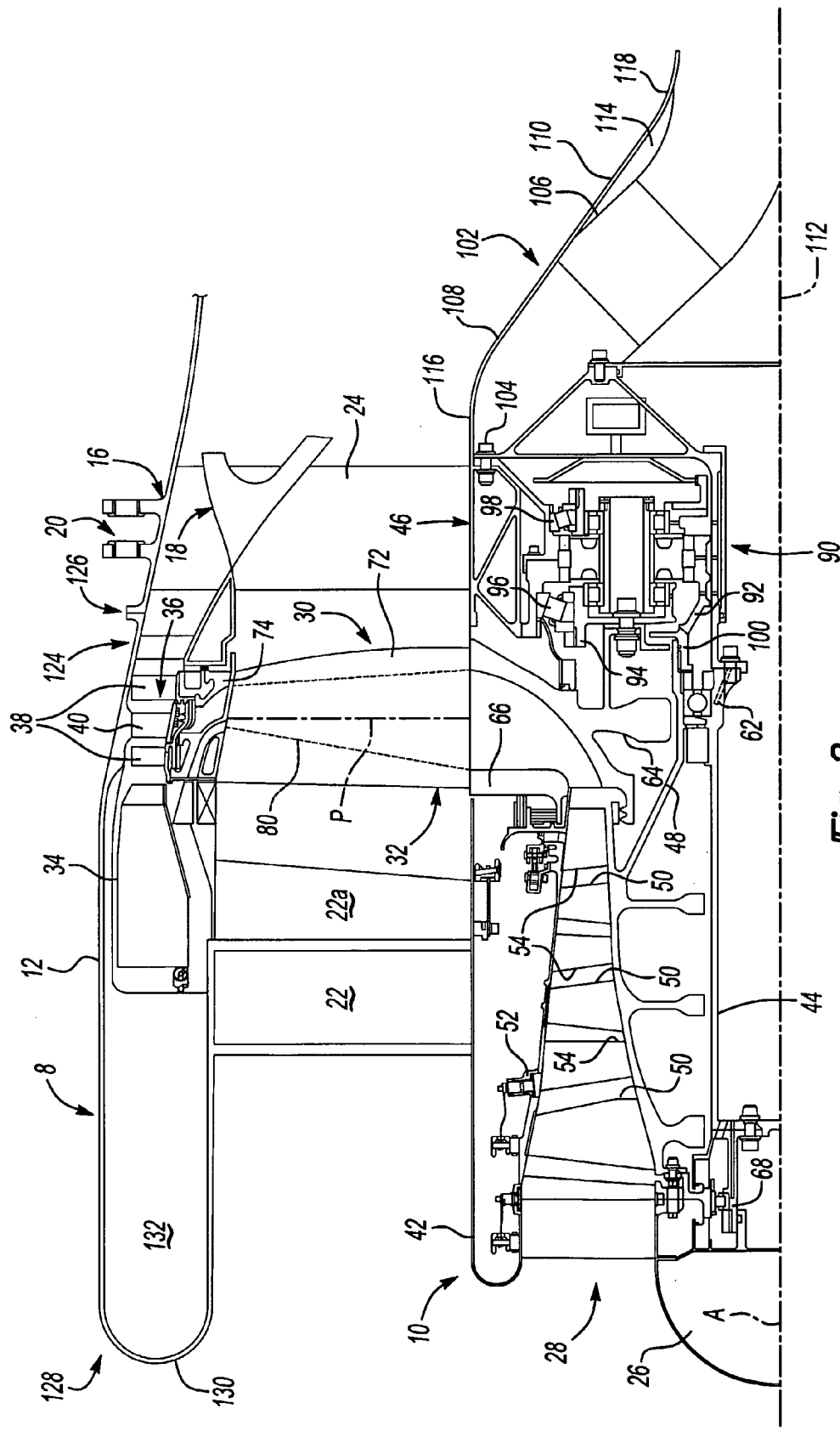
FIG. 2 is a cross-sectional view of the tip turbine engine of FIG. 1.

Referring to FIG. 2, the rotationally fixed static inner support structure 10 includes a splitter 42, a static inner support housing 44 and a static outer support housing 46 located coaxial to said engine centerline A.

The axial compressor 28 includes the axial compressor rotor 48, from which a plurality of compressor blades 50 extend radially outwardly, and a compressor case 52 fixedly mounted to the splitter 42. A plurality of compressor vanes 54 extend radially inwardly from the compressor case 52 between stages of the compressor blades 50. The compressor blades 50 and compressor vanes 54 are arranged circumferentially about the axial compressor rotor 48 in stages (three stages of compressor blades 50 and compressor vanes 54 are shown in this example). The axial compressor rotor 48 is mounted for rotation upon the static inner support housing 44 through a forward bearing assembly 68 and an aft bearing assembly 62.

The fan-turbine rotor assembly 30 includes a fan hub 64 that supports a plurality of the hollow fan blades 32. Each hollow fan blade 32 includes an inducer section 66, a hollow fan blade section 72 and a diffuser section 74. The inducer section 66 receives airflow from the axial compressor 28 generally parallel to the engine centerline A and turns the airflow from an axial airflow direction toward a radial airflow direction. The airflow is radially communicated through a core airflow passage 80 within the fan blade section 72 where the airflow is centrifugally compressed. From the core airflow passage 80, the diffuser section 74 turns the airflow toward an axial airflow direction toward the annular combustor 34. Preferably the airflow is diffused axially forward in the engine 6, however, the airflow may alternatively be communicated in another direction.

A gearbox assembly 90 aft of the fan-turbine rotor assembly 30 provides a speed increase between the fan-turbine rotor assembly 30 and the axial compressor 28. The gearbox assembly 90 is mounted for rotation between the static inner support housing 44 and the static outer support housing 46. The gearbox assembly 90 includes a sun gear shaft 92 which rotates with the axial compressor 28 and a planet carrier 94 which rotates with the fan-turbine rotor assembly 30 to provide a speed differential therebetween. The gearbox assembly 90 is preferably a planetary gearbox that provides co-rotating or counter-rotating rotational engagement between the fan-turbine rotor assembly 30 and an axial compressor rotor 48. The gearbox assembly 90 is mounted for rotation between the sun gear shaft 92 and the static outer support housing 46 through a forward bearing 96 and a rear bearing 98. The forward bearing 96 and the rear bearing 98 are both tapered roller bearings and both handle radial loads. The forward bearing 96 handles the aft axial load, while the rear bearing 98 handles the forward axial loads. The sun gear shaft 92 is rotationally engaged with the axial compressor rotor 48 at a splined interconnection 100 or the like. Alternatively, the gearbox assembly 90 could provide a speed decrease between the fan-turbine rotor assembly 30 and the axial compressor rotor 48.

A tailcone assembly 102 is mounted on the static outer support housing 46 with a set of fasteners 104, although only one fastener is illustrated in the FIG. 2. The tailcone assembly 102 houses a device 106, such as an oil cooler or other device, and includes a frustoconical surface 108. A wall structure 110 disposed about central axis 112 forms the frustoconical surface 108. The wall structure 110 defines an interior compartment 114 and a forward portion 116 that tapers to an aft portion 118 of the tailcone assembly 102.

The integral case portion 12 of the engine 6 includes a rear portion 124 welded at a flange joint 126 to the exhaust case portion 16. A forward portion 128 of the integral case portion 12 includes an arcuate portion 130 that curves radially inwardly relative to the engine centerline A. The arcuate portion 130 defines a forward end of a compartment 132. The annular combustor 34 is housed and mounted in the compartment 132. The fan inlet guide vanes 22 are integrally formed with the arcuate portion 130 to form the integral case portion, which is a unitary engine case. In one example, the rear portion 124, forward portion 128, and fan inlet guide vanes are integrally formed from a titanium alloy or other alloy in a casting process, however, other forming processes such but not limited to forging may be utilized.

In operation, air enters the axial compressor 28, where it is compressed by the three stages of the compressor blades 50 and compressor vanes 54. The compressed air from the axial compressor 28 enters the inducer section 66 in a direction generally parallel to the engine centerline A and is turned by the inducer section 66 radially outwardly through the core airflow passage 80 of the hollow fan blades 32. The airflow is further compressed centrifugally in the hollow fan blades 32 by rotation of the hollow fan blades 32. From the core airflow passage 80, the airflow is turned and diffused axially forward in the engine 6 into the annular combustor 34. The compressed core airflow from the hollow fan blades 32 is mixed with fuel in the annular combustor 34 and ignited to form a high-energy gas stream. The high-energy gas stream is expanded over the plurality of tip turbine blades 38 mounted about the outer periphery of the fan-turbine rotor assembly 30 to drive the fan-turbine rotor assembly 30, which in turn drives the axial compressor 28 through the gearbox assembly 90.

Concurrent therewith, the fan-turbine rotor assembly 30 discharges fan bypass air axially aft and the exhaust mixer 18 merges bypass air with the high energy gas stream in the exhaust case portion 16. The exit guide vanes 24 located between the static outer support housing 46 and the outer case 8 guide the combined airflow out of the engine 6 to provide forward thrust.

Figure 3:
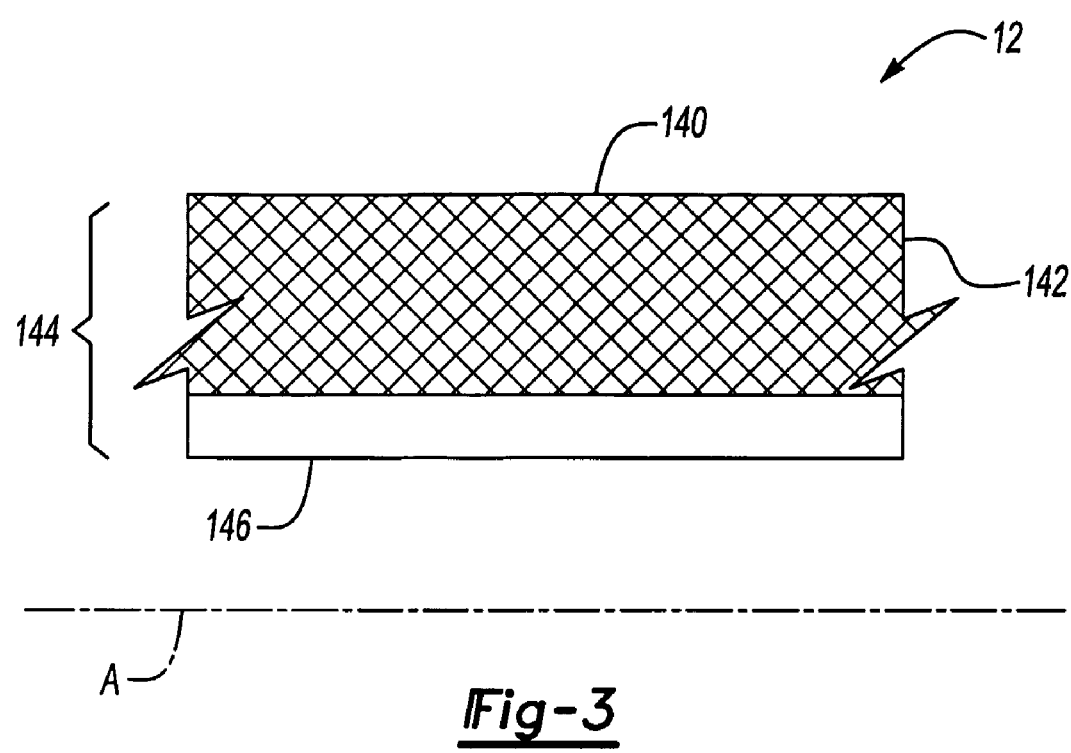
FIG. 3 is a cross-sectional view of a double wall construction of the engine of FIG. 1.

FIG. 3 is a cross-sectional view of a double wall construction of the engine 6 of FIG. 1. The integral case portion 12 preferably includes at least a composite layer 140 with woven Kevlar™ fiber reinforcement 142 in a double wall construction 144 with a metallic layer 146, although other composites and other double or multiple wall constructions may be utilized. The double wall construction 144 provides structural integrity to the engine 6 and may assist in containing failures of the fan-turbine rotor assembly 30, the diffuser section 74, the annular combustor 34, and the turbine 36. Preferably, the composite layer 140 is radially outward from the metallic layer 146 relative to the engine centerline A, although in other examples the metallic layer 146 may be radially outward relative to the composite layer 140.

Figure 4:
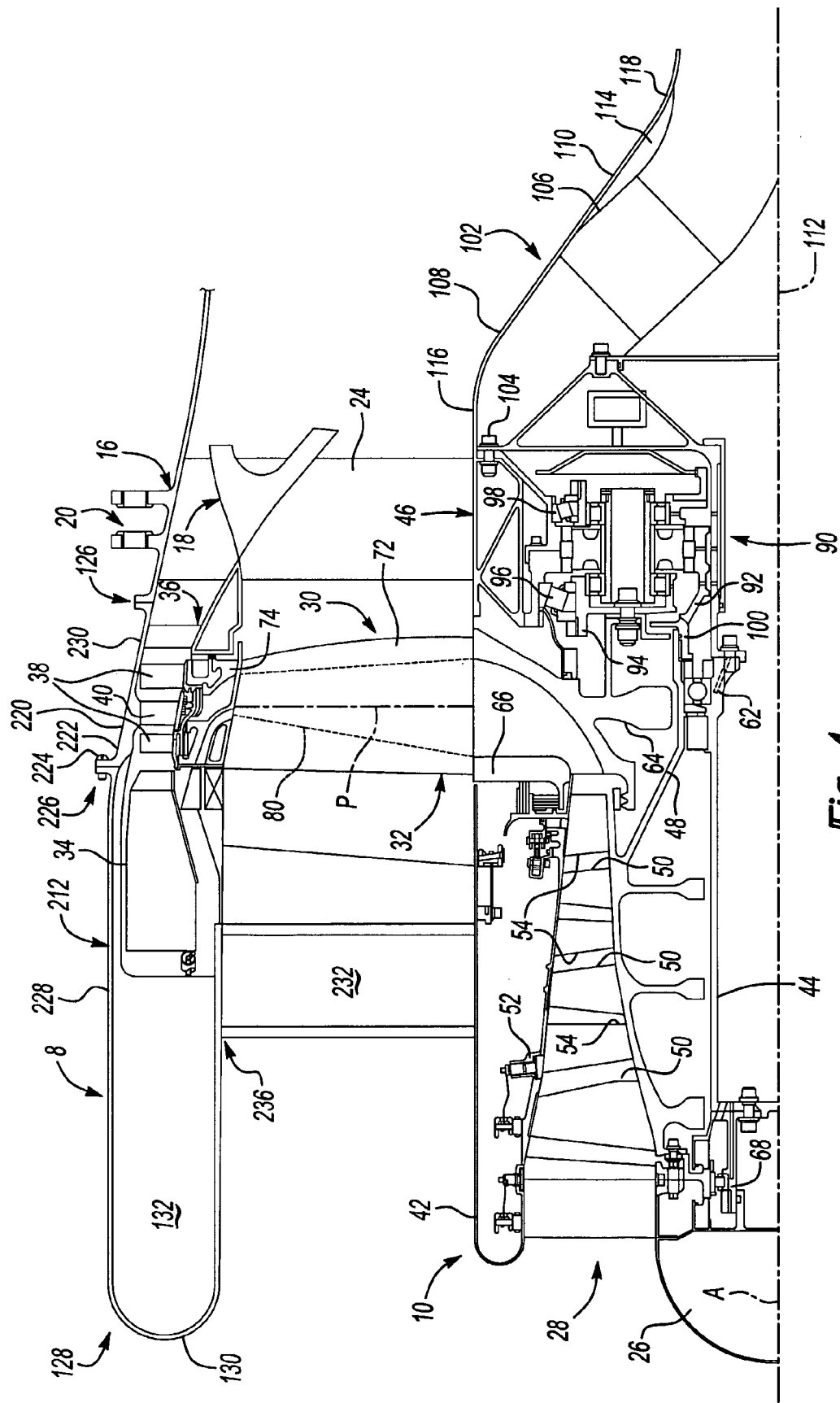
FIG. 4 is a cross-sectional view of another embodiment of the tip turbine engine of the present invention, showing the integral case portion with several joined case portions.

FIG. 4 shows another embodiment of the tip turbine engine assembly of the present invention. The integral case portion 212 is located radially outward from the fan-turbine rotor assembly 30, the diffuser section 74, the annular combustor 34, and the turbine 36 and may include a double wall construction 144 as illustrated in FIG. 3. The integral case portion 212 includes an integral fan case portion 220 joined on a forward end 222 with a fastener 224 at a flange joint 226 to an integral combustor case portion 228. The integral fan case portion 220 is located radially outward from the fan-turbine rotor assembly 30 and the diffuser section 74 and is welded at a rear end portion 230 to the exhaust case portion 16. The integral combustor case portion 228 is welded to an integral inlet guide vane 232 at a flange joint 236. This may provide the benefit of being able to pre-assemble the integral case portion 212 before assembling the integral case portion 212 onto the engine 6. The integral combustor case portion 228 is located radially outward from the annular combustor 34. It is to be understood that additional separate engine case portions may be utilized to form the integral case portion 212 and that the various engine case portions may be joined together using welding, fasteners, or other methods of joining.

The present invention therefore eliminates assembly of several cases by providing an integrated engine case for the engine fan and combustor, and turbine.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A tip turbine engine assembly comprising:
a fan rotatable in a fan plane about an axis, said fan including a fan blade defining a core airflow passage through said fan blade;
a compressor rotatable in a compressor plane spaced axially forward of said fan plane and directing compressed air to said airflow passage;
a turbine extending radially outwardly from said fan;
a combustor axially spaced from said fan, said combustor communicating with said airflow passage; and,
an engine case radially outward from said fan and said combustor.

2. The assembly as recited in claim 1, wherein said fan plane does not intersect said combustor.

3. The assembly as recited in claim 1, further comprising a radially inwardly extending guide vane fixed to said engine case.

4. The assembly as recited in claim 1, wherein said blade has an internal first inducer section that turns said compressed air from traveling axially to travelling radially.

5. The assembly as recited in claim 4 wherein said blade has a hollow section for receiving said compressed air and centrifugally compressing said compressed air.

6. The assembly of claim 5 wherein said blade further comprises a diffuser for directing said compressed air to said combustor.

7. The assembly of claim 6 wherein said diffuser turns said compressed air from radially to axially directed.

8. The assembly as recited in claim 1, wherein said engine case comprises a composite layer with fiber reinforcement.

9. The assembly as recited in claim 1, wherein said engine case comprises a composite layer adjacent to a metallic layer.

10. The assembly of claim 1 wherein said turbine further comprises a tip turbine blade.

11. The assembly of claim 10 further comprising a barrier separating said tip turbine blade from said hollow fan blade such that compressed air passing through said hollow fan blade does not contact said tip turbine blade.

12. The assembly of claim 10 wherein said combustor directs combustion gases only to said turbine tip blade.

13. A method for providing thrust by a jet engine comprising:
compressing an air flow through an axial compressor;
further compressing said air flow by centrifugally compressing said air flow in a rotating hollow fan blade in a first plane;
diffusing said compressed air within said hollow fan blade;
combusting said diffused air flow by a combustor in a second plane; and
directing said combusted air flow against a tip turbine placed radially outwardly from said fan in said first plane.

14. The method as recited in claim 13, further comprising:
directing said compressed air from said axial compressor through an internal inducer in said hollow fan blade.

15. The method of claim 14 wherein said blade further comprises a diffuser for directing said compressed air from said hollow fan blade to said combustor.

16. The method of claim 13 further comprising separating a tip turbine blade from said hollow fan blade such that compressed air passing through said hollow fan blade does not contact said tip turbine blade.

17. The method of claim 13 further comprising separating a tip turbine blade from said hollow fan blade such that combusted air passing through hollow blade and said combustor does not contact any external surface of said hollow fan blade.

* * * * *